US010027450B2

United States Patent
Rong et al.

(10) Patent No.: US 10,027,450 B2
(45) Date of Patent: Jul. 17, 2018

(54) SYSTEM AND METHOD FOR COVERAGE ENHANCEMENT

(71) Applicant: Futurewei Technologies, Inc., Plano, TX (US)

(72) Inventors: Zhigang Rong, San Diego, CA (US); Yunsong Yang, San Diego, CA (US)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 134 days.

(21) Appl. No.: 15/183,329

(22) Filed: Jun. 15, 2016

(65) Prior Publication Data

US 2017/0019891 A1 Jan. 19, 2017

Related U.S. Application Data

(60) Provisional application No. 62/192,408, filed on Jul. 14, 2015.

(51) Int. Cl.
- H04W 72/04 (2009.01)
- H04L 5/00 (2006.01)
- H04B 7/00 (2006.01)
- H04W 84/12 (2009.01)

(52) U.S. Cl.
CPC ............. H04L 5/0007 (2013.01); H04B 7/00 (2013.01); H04L 5/0053 (2013.01); H04W 84/12 (2013.01)

(58) Field of Classification Search
CPC ....... H04L 5/0007; H04L 5/0053; H04B 7/00; H04W 84/12
See application file for complete search history.

(56) References Cited

U.S. PATENT DOCUMENTS

| | | | |
|---|---|---|---|
| 2011/0051705 A1* | 3/2011 | Jones, IV | H04L 27/2613 370/338 |
| 2012/0195282 A1 | 8/2012 | Choi et al. | |
| 2012/0213214 A1 | 8/2012 | Vermani et al. | |
| 2013/0294343 A1 | 11/2013 | Akita et al. | |
| 2014/0211704 A1 | 7/2014 | Sampath et al. | |
| 2014/0369276 A1 | 12/2014 | Porat et al. | |
| 2014/0369576 A1 | 12/2014 | Porat et al. | |
| 2016/0007325 A1* | 1/2016 | Seok | H04B 7/0452 370/329 |
| 2016/0112851 A1* | 4/2016 | Li | H04L 69/18 370/338 |
| 2016/0212247 A1* | 7/2016 | Azizi | H04L 27/2613 |

(Continued)

FOREIGN PATENT DOCUMENTS

| | | |
|---|---|---|
| WO | 2015031323 A1 | 3/2015 |
| WO | 2015081269 A1 | 6/2015 |
| WO | 2015081288 A1 | 6/2015 |

OTHER PUBLICATIONS

Cariou et al., "High-efficiency WLAN", IEEE 802.11-13/0331r5, Mar. 19, 2013, 21 pages.

(Continued)

*Primary Examiner* — Brian D Nguyen
(74) *Attorney, Agent, or Firm* — Slater Matsil, LLP

(57) ABSTRACT

A method for operating a transmitting device includes generating a frame having at least a first preamble and a second preamble, and transmitting the first preamble in a first frequency resource and the second preamble in a second frequency resource, wherein the second frequency resource is smaller than the first frequency resource.

20 Claims, 9 Drawing Sheets

(56) References Cited

U.S. PATENT DOCUMENTS

2016/0227532 A1\* 8/2016 Azizi ................ H04L 69/22
2017/0222769 A1\* 8/2017 Li ..................... H04L 1/206

OTHER PUBLICATIONS

Stacey, "Specification Framework for TGax", IEEE P802.11 Wireless LANs, IEEE 802.11-15/0132r13, Dec. 7, 2015, 38 pages.
Cariou et al., "High-efficiency WLAN Straw poll", IEEE 802.11-13/0339r10, Mar. 19, 2013, 7 pages.

\* cited by examiner

SYSTEM AND METHOD FOR COVERAGE ENHANCEMENT

CROSS-REFERENCE TO RELATED APPLICATIONS

This application claims the benefit of U.S. Provisional Application No. 62/192,408, filed Jul. 14, 2015, entitled "System and Method for Coverage Enhancement," which application is hereby incorporated herein by reference.

TECHNICAL FIELD

The present invention relates generally to a system and method for digital communications, and, in particular embodiments, to a system and method for coverage enhancement.

BACKGROUND

The number of devices using Wireless Local Area Networks (WLAN) continues to show dramatic growth. WLANs allow users the ability to connect to high-speed services without being tethered to wireline connections. WLANs are wireless communications systems that are based on the IEEE 802.11 series of technical standards, also commonly referred to as WiFi. A popular deployment for WLANs is in an outdoor environment. An outdoor deployment presents a different environment than an indoor deployment with generally large and open coverage areas.

A newly formed IEEE 802.11 Study Group named "High Efficiency WLAN" (HEW) has been formed to study, among other things, improving system efficiency and area throughput, and improving real world performance in indoor and outdoor deployments in the presence of interfering sources and dense heterogeneous networks with moderate to heavy user loaded access points (APs). HEW's target usage scenario is a high density environment.

SUMMARY

Example embodiments provide a system and method for coverage enhancement.

In accordance with an example embodiment, a method for operating a transmitting device is provided. The method includes generating, by the transmitting device, a frame having at least a first preamble and a second preamble, and transmitting, by the transmitting device, the first preamble in a first frequency resource and the second preamble in a second frequency resource, wherein the second frequency resource is smaller than the first frequency resource.

In accordance with an example embodiment, a method for operating a receiving device is provided. The method includes receiving, by the receiving device, a first preamble of a frame in a first frequency resource, and receiving, by the receiving device, a second preamble of the frame in a second frequency resource, wherein the second frequency resource is smaller than the first frequency resource.

In accordance with an example embodiment, a transmitting device is provided. The transmitting device includes a processor, and a computer readable storage medium storing programming for execution by the processor. The programming including instructions to configure the transmitting device to generate a frame having at least a first preamble and a second preamble, and transmit the first preamble in a first frequency resource and the second preamble in a second frequency resource, wherein and the second frequency resource is smaller than the first frequency resource.

In accordance with an example embodiment, a receiving device is provided. The receiving device includes a processor, and a computer readable storage medium storing programming for execution by the processor. The programming including instructions to configure the receiving device to receive a first preamble of a frame in a first frequency resource, and receive a second preamble of the frame in a second frequency resource, wherein the second frequency resource is smaller than the first frequency resource.

BRIEF DESCRIPTION OF THE DRAWINGS

For a more complete understanding of the present disclosure, and the advantages thereof, reference is now made to the following descriptions taken in conjunction with the accompanying drawings, in which.

DETAILED DESCRIPTION OF ILLUSTRATIVE EMBODIMENTS

The operating of the current example embodiments and the structure thereof are discussed in detail below. It should be appreciated, however, that the present disclosure provides many applicable inventive concepts that can be embodied in a wide variety of specific contexts. The specific embodiments discussed are merely illustrative of specific structures of the embodiments and ways to operate the embodiments disclosed herein, and do not limit the scope of the disclosure.

Figure 1:
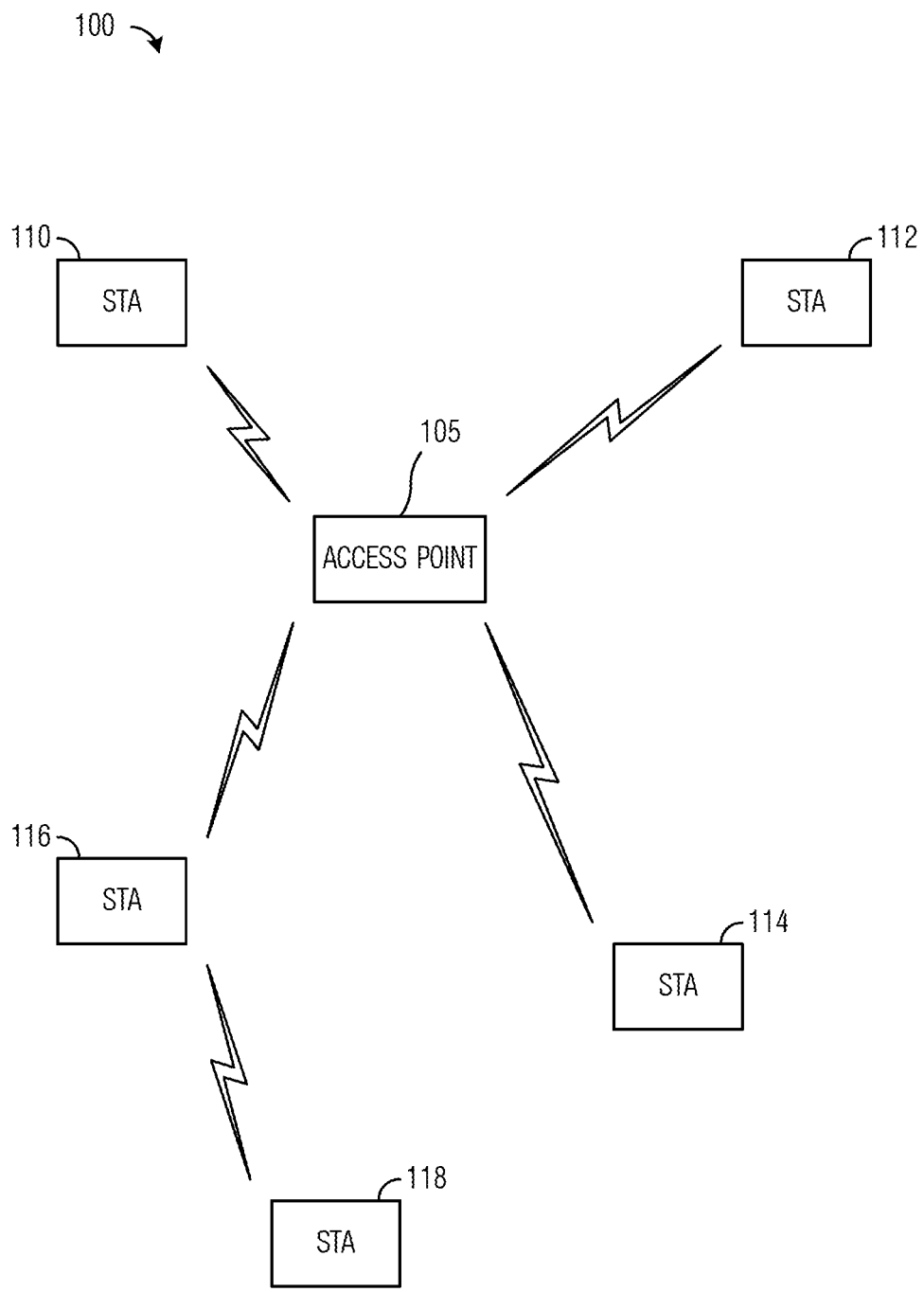
FIG. 1 is an example wireless communications system according to example embodiments described herein.

FIG. 1 illustrates an example wireless communications system 100. Wireless communications system 100 includes an access point (AP) 105 that serves one or more stations, such as stations (STA) 110-118, by receiving communications originating from the stations and then forwarding the communications to their intended destinations or receiving communications destined to the stations and then forwarding the communications to their intended stations. In addition to communicating through AP 105, some stations may directly communicate with one another. As an illustrative example, station 116 may transmit directly to station 118. APs may also be commonly referred to as NodeBs, evolved NodeBs (eNBs), base stations, controllers, communications controllers, and the like. Stations may also be commonly referred to as mobile stations, mobiles, user equipment (UE), terminals, users, subscribers, and the like.

While it is understood that communications systems may employ multiple access points capable of communicating with a number of stations, only one access point and five stations are illustrated for simplicity.

Transmissions to and/or from a station occur on a shared wireless channel. WLANs make use of carrier sense multiple access with collision avoidance (CSMA/CA) to enable sharing of the wireless channel. With CSMA/CA, a station desiring to transmit needs to contend for access to the wireless channel before it can transmit. A station may contend for access to the wireless channel using a network allocation vector (NAV). The NAV may be set to a first value to represent that the wireless channel is busy and to a second value to represent that the wireless channel is idle. The NAV may be set by station in accordance with physical carrier sensing and/or reception of transmissions from other stations and/or APs. Therefore, contending for access to the wireless channel may require the station to expend a significant amount of time, thereby decreasing wireless channel utilization and overall efficiency. Furthermore, contending for access to the wireless channel may become difficult if not impossible as the number of stations contending for access increases.

Figure 2:
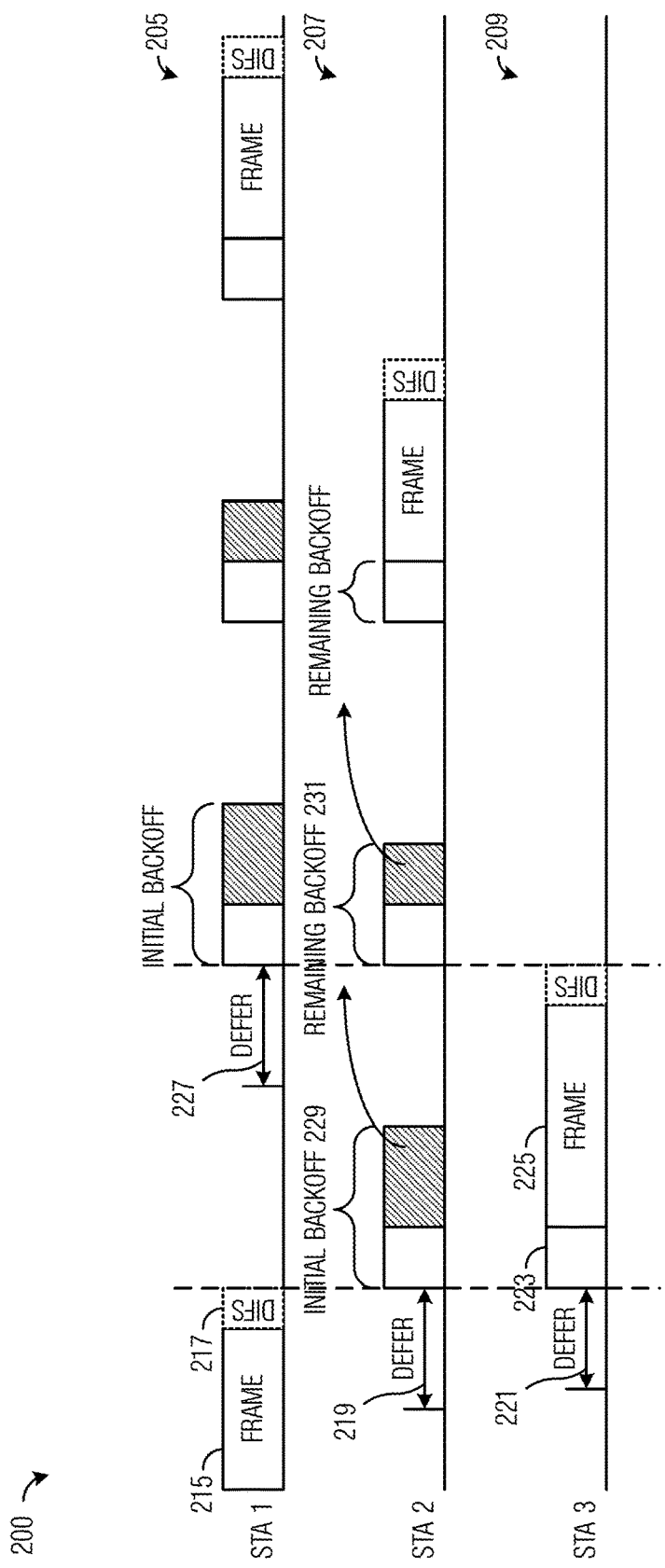
FIG. 2 is a diagram of channel access timing according to example embodiments described herein.

FIG. 2 illustrates a diagram 200 of channel access timing. A first trace 205 represents channel access for a first station (STA 1), a second trace 207 represents channel access for a second station (STA 2), and a third trace 209 represents channel access for a third station (STA 3). A short interframe space (SIFS) has a duration of 16 microseconds, a point coordination function (PCF) inter-frame space (PIFS) has a duration of 25 microseconds, while a distributed coordination function (DCF) inter-frame space (DIFS) may last longer than either the SIFS or the PIFS. A backoff period may be a random duration. Therefore, active scanning may not provide the best solution when there are large numbers of stations attempting to perform AP/network discovery.

Orthogonal frequency division multiple access (OFDMA) has been adopted by Task Group ax (TGax) as a feature to improve communications system performance in a high density environment. In OFDMA, the entirety of the bandwidth of the communications system is divided into multiple resource units. As an illustrative example, according to TGax, for a communications system bandwidth of 20 MHz with a fast Fourier transform (FFT) size of 256, the bandwidth can be divided into 9 resource units with each resource unit having 26 tones. A data payload of a frame may be sent in one or more resource units. The bandwidth may be narrow, e.g., when only one resource unit is used the bandwidth is approximately 2 MHz.

Figure 3:
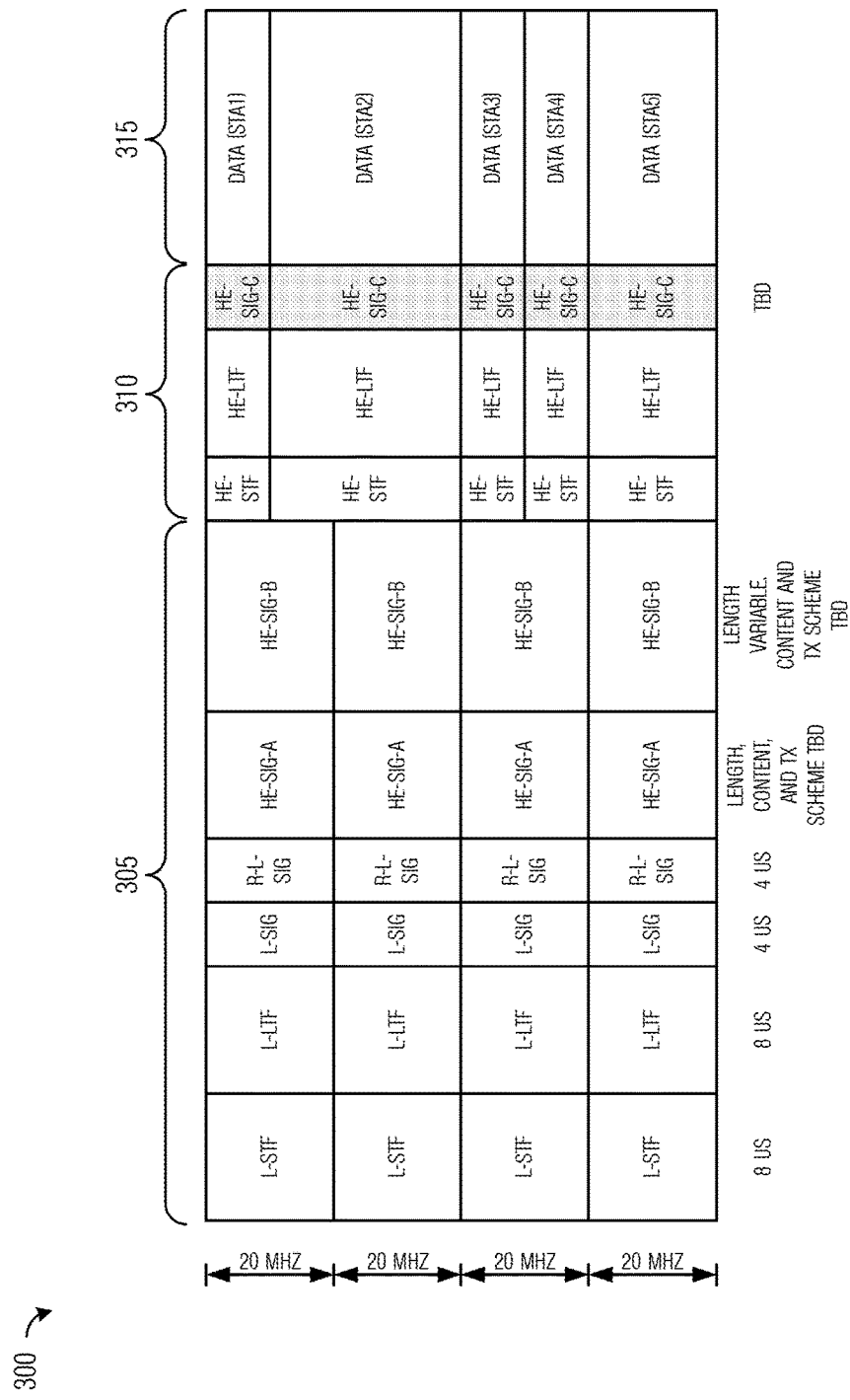
FIG. 3 is an example frame format of a TGax compliant communications system according to example embodiments described herein.

However, to maintain compatibility with legacy devices, a preamble portion of the frame has to be sent in a bandwidth of at least 20 MHz. FIG. 3 illustrates an example frame format 300 of a TGax compliant communications system. Frame format 300 includes a first preamble portion 305 that includes preamble fields transmitted in bandwidths of 20 MHz in order to ensure compatibility with legacy devices. Frame format 300 also includes a second preamble portion 310 that includes preamble fields transmitted in different bandwidths and a data payload 315 that includes data transmitted in different bandwidths. As shown in FIG. 3, the bandwidths of second preamble portion 310 and data payload 315 does not have to be 20 MHz as does first preamble portion 305.

When a data payload of a frame is sent in a narrow bandwidth, e.g., 2 MHz, the bandwidth of the preamble portion, e.g., 20 MHz, is much wider than that of the data payload. Therefore, the preamble portion may become a bottleneck of system coverage. Because the data payload is sent in a narrow bandwidth, the transmitter may concentrate the transmit power into the narrow bandwidth, thus achieving a higher power spectral density (PSD) and greater signal to noise ratio (SNR) at the receiver. However, because the preamble portion is sent in a much wider bandwidth, the transmit power needs to be distributed over the wider bandwidth, resulting in a much lower PSD and SNR at the receiver. If it is assumed that the noise and interference level in the preamble portion and the data payload of the frame are about the same at the receiver, the SNR of the data payload may be approximately 10 times greater than the SNR of the preamble portion. Therefore, to enhance coverage of the communications system, the coverage of the preamble needs to be improved.

One way to enhance coverage of the preamble of the communications system is to use a modulation and coding scheme (MCS) with a lower coding rate. As an example, MCS level 10 may be used for a field in the preamble to improve its coverage. However, due to standardization constraints, there is a limit on the number of available MCS levels to keep implementation complexity and costs at a reasonable level. Furthermore, if the same MCS level is used in the preamble and the data payload, the coverage bottleneck still remains with the preamble portion due to the advantages afforded the data payload through the use of the narrower bandwidth.

According to an example embodiment, a preamble of a frame is transmitted in a smaller bandwidth to improve coverage. In order to maintain compatibility with legacy devices, the frame includes a plurality of preambles. The frame includes a first preamble that is transmitted in the full bandwidth. As an example, the first preamble includes the fields needed to maintain legacy device compatibility. In other words, the first preamble is the legacy preamble. The first preamble is transmitted in the full bandwidth, such as 20 MHz, for example.

According to an example embodiment, a second preamble of the frame is transmitted in less bandwidth than the first preamble to improve coverage. The second preamble may include some of the fields of the first preamble. However, the second preamble may also include some fields usable by non-legacy devices, such as TGax compatible devices.

According to an example embodiment, the frame includes a third preamble that is sent with the data payload of the frame. The third preamble is transmitted with the same bandwidth as the data payload. The third preamble may be transmitted with the same bandwidth as the first preamble. The third preamble may be transmitted with a different bandwidth as the first preamble. The third preamble may be transmitted with the same bandwidth as the second preamble. The third preamble may be transmitted with a different bandwidth as the second preamble. If there are multiple data payloads in different frequencies ranges, multiple instances of the third preamble are transmitted. The instances of the third preamble may be the same or they may be different.

Figure 4:
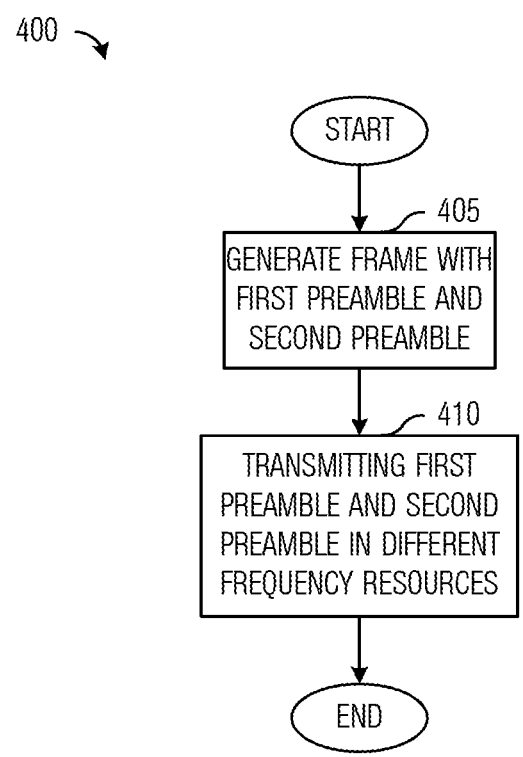
FIG. 4 illustrates a flow diagram of example operations occurring in a transmitter according to example embodiments described herein.

FIG. 4 illustrates a flow diagram of example operations 400 occurring in a transmitter. Operations 400 may be indicative of operations occurring in a transmitter that is TGax compliant.

Operations 400 begin with the transmitter generating a frame with a first preamble and a second preamble (block 405). The first preamble may be used to support legacy compatibility and the second preamble may be used to support TGax specific functionality. The transmitter transmits the first preamble and the second preamble in different frequency resources (block 410). As an example, a first frequency resource used to transmit the first preamble is at least 20 MHz wide and a second frequency resource used to transmit the second preamble is less than 20 MHz wide. Furthermore, the frame may also include a third preamble that is transmitted using a third frequency resource. The third frequency resource may have the same width as the first frequency resource or the second frequency resource. Alternatively, the third frequency resource may be different from both the first and second frequency resources. Details of example embodiments regarding frames and different frequency resources are provided below.

Figure 5:
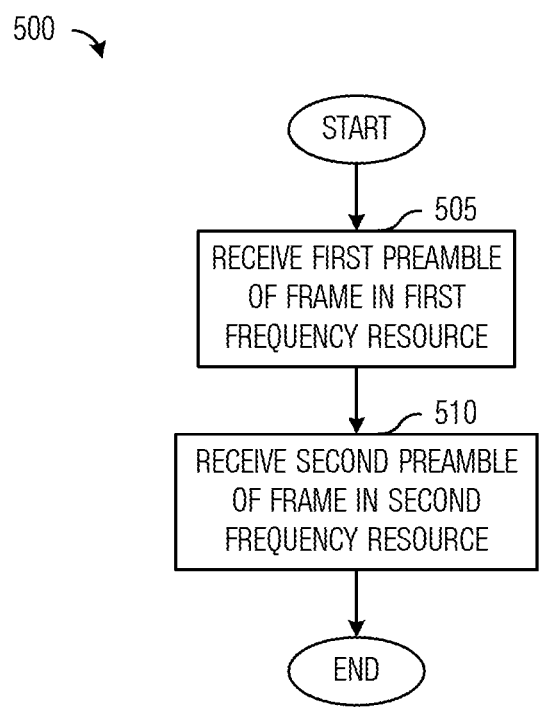
FIG. 5 illustrates a flow diagram of example operations occurring in a receiver according to example embodiments described herein.

FIG. 5 illustrates a flow diagram of example operations 500 occurring in a receiver. Operations 500 may be indicative of operations occurring in a receiver that is TGax compliant.

Operations 500 begin with the receiver receiving a first preamble of a frame in a first frequency resource (block 505). The first preamble may support legacy compatibility, meaning that the first frequency resource is at least 20 MHz wide. The receiver receives a second preamble of the frame in a second frequency resource (block 510). The second preamble may support TGax specific functionality. The first frequency resource and the second frequency resource are different frequency resources. Alternatively, the second frequency resource is a subset of the first frequency resource. In other words, the second frequency resource may be smaller than the first frequency resource. The receiver may receive a third preamble of the frame in a third frequency resource. The third frequency resource may the same as the first frequency resource. Alternatively, the third frequency resource and the first frequency resource are different frequency resources. The receiver may receive a fourth preamble of the frame in a fourth frequency resource.

Figure 6:
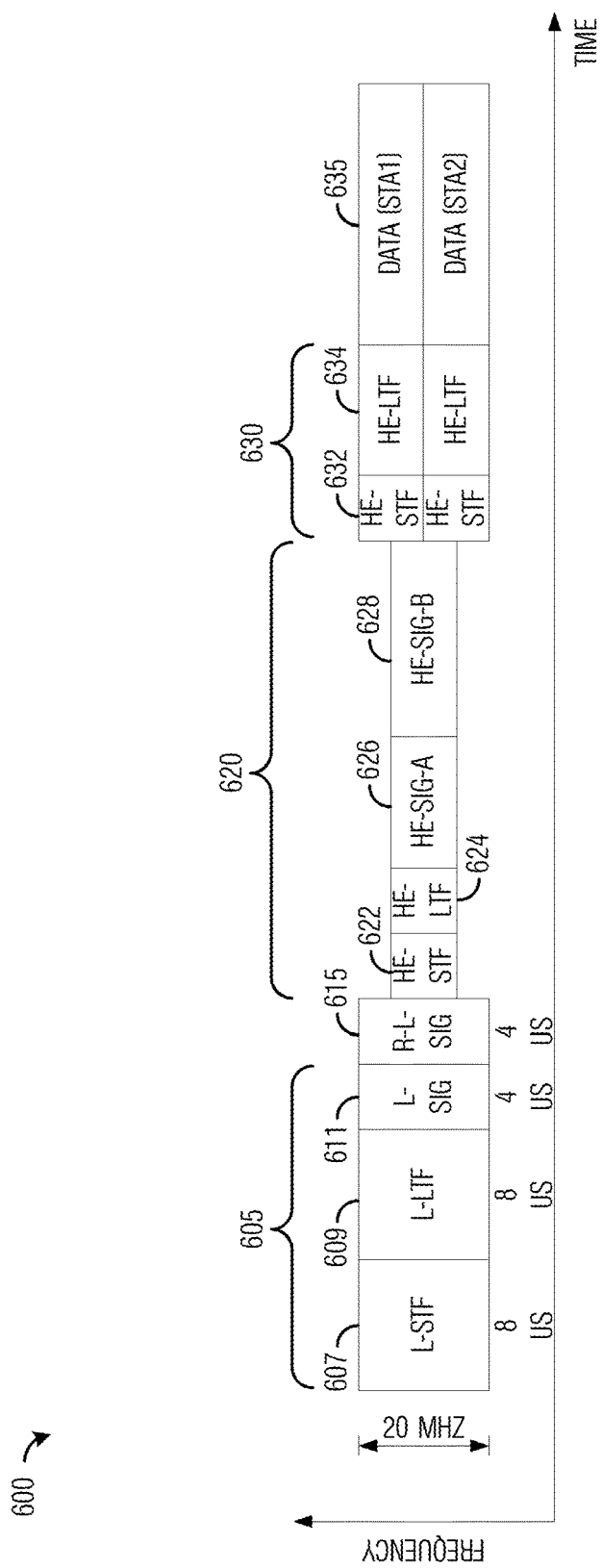
FIG. 6 illustrates a first example frame according to example embodiments described herein.

FIG. 6 illustrates a first example frame 600. Frame 600 is representative of a frame transmitted by a first device (such as an access point or a station) to a second device (such as a station or an access point). Frame 600 includes a first preamble 605 (i.e., a legacy preamble with a legacy short training field (L-STF) 607, a legacy long training field (L-LTF) 609, and a legacy signal field (L-SIG) 611) based on a FFT size of 64 and in a bandwidth of at least 20 MHz. Frame 600 also includes a repeated L-SIG (R-L-SIG) 615 that is a repeated version of L-SIG 611. R-L-SIG 615 is also based on a FFT size of 64 and in a bandwidth of at least 20 MHz. In a frequency domain, R-L-SIG 615 may be multiplied with a predetermined sequence to indicate that the following signal is a narrow bandwidth signal, for coverage enhancement purposes, for example. R-L-SIG 615 may be considered to be an additional preamble of frame 600.

Frame 600 also includes a second preamble 620 in a narrow bandwidth (e.g., one or more resource units, with each resource unit having 26 tones, for example). Second preamble 620 includes (but not limited to): training signals such as a high efficiency short training field (HE-STF) 622 and high efficiency long training field (HE-LTF) 624; and control information such as a first high efficiency signal field (HE-SIG-A) 626 and optionally a second high efficiency signal field (HE-SIG-B) 628. Second preamble 620 may be based on a larger FFT size (larger than the 64 used in first preamble 605), such as 128 or 256, for example. Therefore, second preamble 620 has a longer symbol duration than first preamble 605. The longer symbol duration may increase coverage, as well as, spectral efficiency. Second preamble 620 may be sent in one or more resource units in the center of the 20 MHz channel so that there is no need to signal the location of the resource unit(s) used to convey second preamble 620.

Frame 600 also includes an additional preamble 630 followed by corresponding data payloads 635. Additional preamble 630 includes HE-STF 632 and HE-LTF 634, for example. Additional preamble 630 may be based on a larger FFT size (larger than the 64 used in first preamble 605), such as 128 or 256. Therefore, additional preamble 630 has a longer symbol duration than first preamble 605, yielding increased coverage and spectral efficiency.

It is noted that although shown in FIG. 6 as two different instances of additional preamble 630 and data payload 635 are transmitted, frame 600 may include 1 or more instances of additional preamble 630 and data payloads 635. If 1 instance of additional preamble 630 and data payloads 635 are sent, additional preamble 630 and data payloads 635 may occupy the same bandwidth as first preamble 605. If more than 1 instance of additional preamble 630 and data payloads 635 are sent, then each instance of additional preamble 630 and data payloads 635 may occupy less bandwidth than first preamble 605. In other words, the bandwidth occupied by additional preamble 630 and data payloads 635 can be different from the bandwidth occupied by first preamble 605 and may be dependent upon the number of instances transmitted. Therefore, the illustration of two instances of additional preamble 630 and data payloads 635 in frame 600 should not be construed as being limiting to either the scope or spirit of the example embodiments.

As shown in FIG. 6, multiple instances of additional preamble 630 and data payloads 635 are included in frame 600. The multiple instances of additional preamble 630 and data payloads 635 may be replicated copies to achieve frequency diversity. Alternatively, the multiple instances of additional preamble 630 and data payloads 635 may contain information intended for different receivers or groups of receivers. As an illustrative example, each instance is intended for a different station. As another illustrative example, each instance is intended for a different application executing on an access point. As yet another illustrative example, the instances carry the same information intended for the same receiver (or group of receivers) and their transmission on different frequency resources enables frequency diversity and potentially greater immunity to interference.

Figure 7:
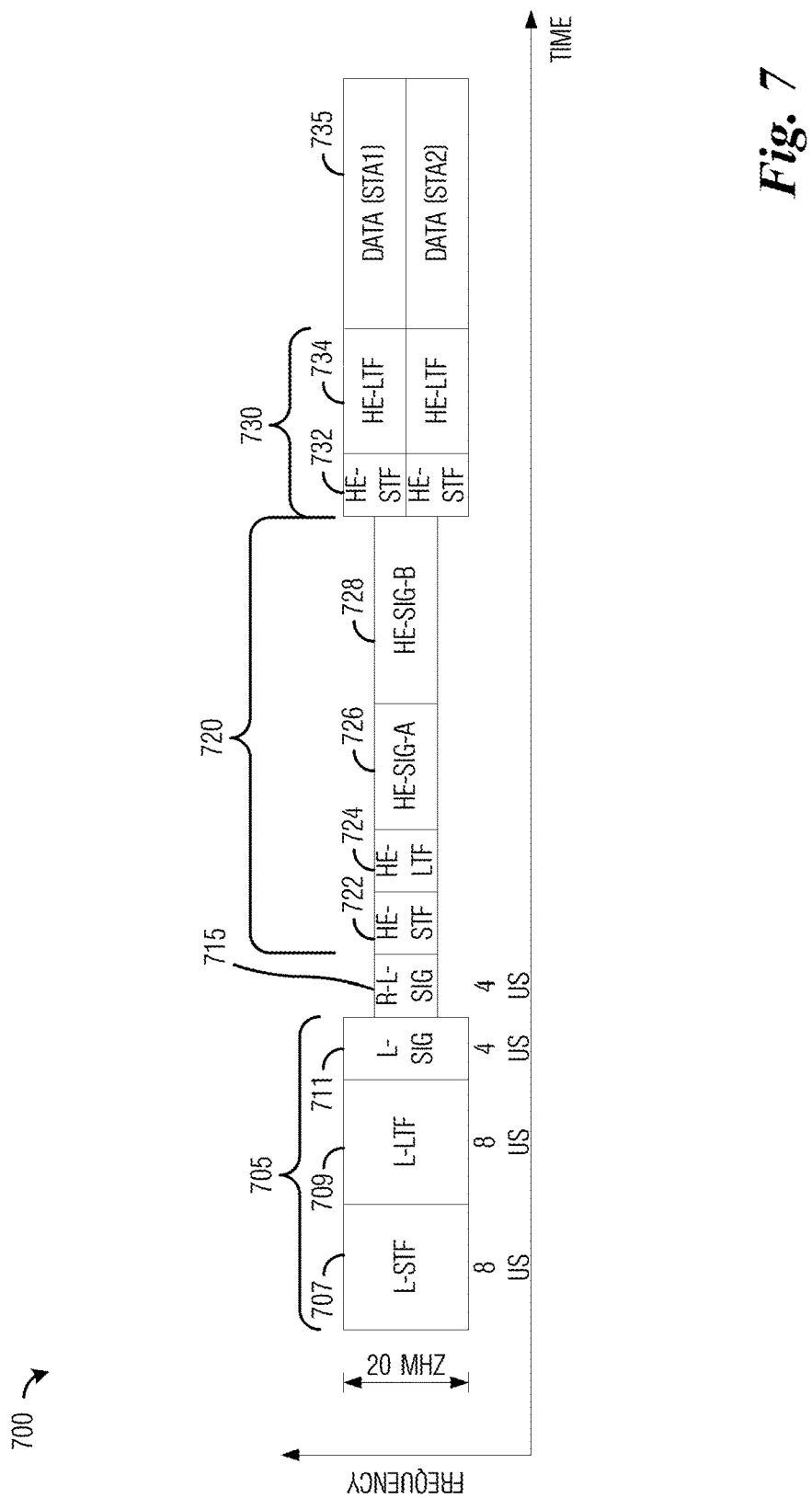
FIG. 7 illustrates a second example frame according to example embodiments described herein.

FIG. 7 illustrates a second example frame 700. Frame 700 includes a first preamble 705 (i.e., the legacy preamble with a L-STF 707, a L-LTF 709, and a L-SIG 711) based on a FFT size of 64 and in a bandwidth of at least 20 MHz.

Frame 700 also includes a R-L-SIG 715 also based on a FFT size of 64 and in a narrow bandwidth. In other words, R-L-SIG 715 is sent in less bandwidth than first preamble 705. R-L-SIG 715 may be sent in a few tones in the 20 MHz channel. The few tones may be located in the center of the 20 MHz channel. Alternatively, the few tones may be distributed throughout the 20 MHz channel. R-L-SIG 715 is a partial repetition of L-SIG 711, e.g., the few tones in the 20 MHz channel used to send R-L-SIG 715 repeat corresponding tones from L-SIG 711. A special pattern of R-L-

SIG 715 in the frequency domain, e.g., only a few of the tones in the 20 MHz channel is non-zero power and the rest is zero-power, may serve as an indication that the following signals are narrow bandwidth signals. R-L-SIG 715 may be considered to be an additional preamble of frame 700.

Frame 700 also includes a second preamble 720 sent in a narrow bandwidth. The second preamble includes (but not limited to): training signals such as a HE-STF 722 and a HE-LTF 724; and control information such as a HE-SIG-A 726 and optionally a HE-SIG-B 728. Frame 700 also includes 1 or more instances of an additional preamble 730 followed by corresponding data payloads 735. Additional preamble 730 includes HE-STF 732 and HE-LTF 734, for example. Additional preamble 730 and data payloads 735 may be sent in the same bandwidth as first preamble 705 or in narrower bandwidth.

Figure 8:
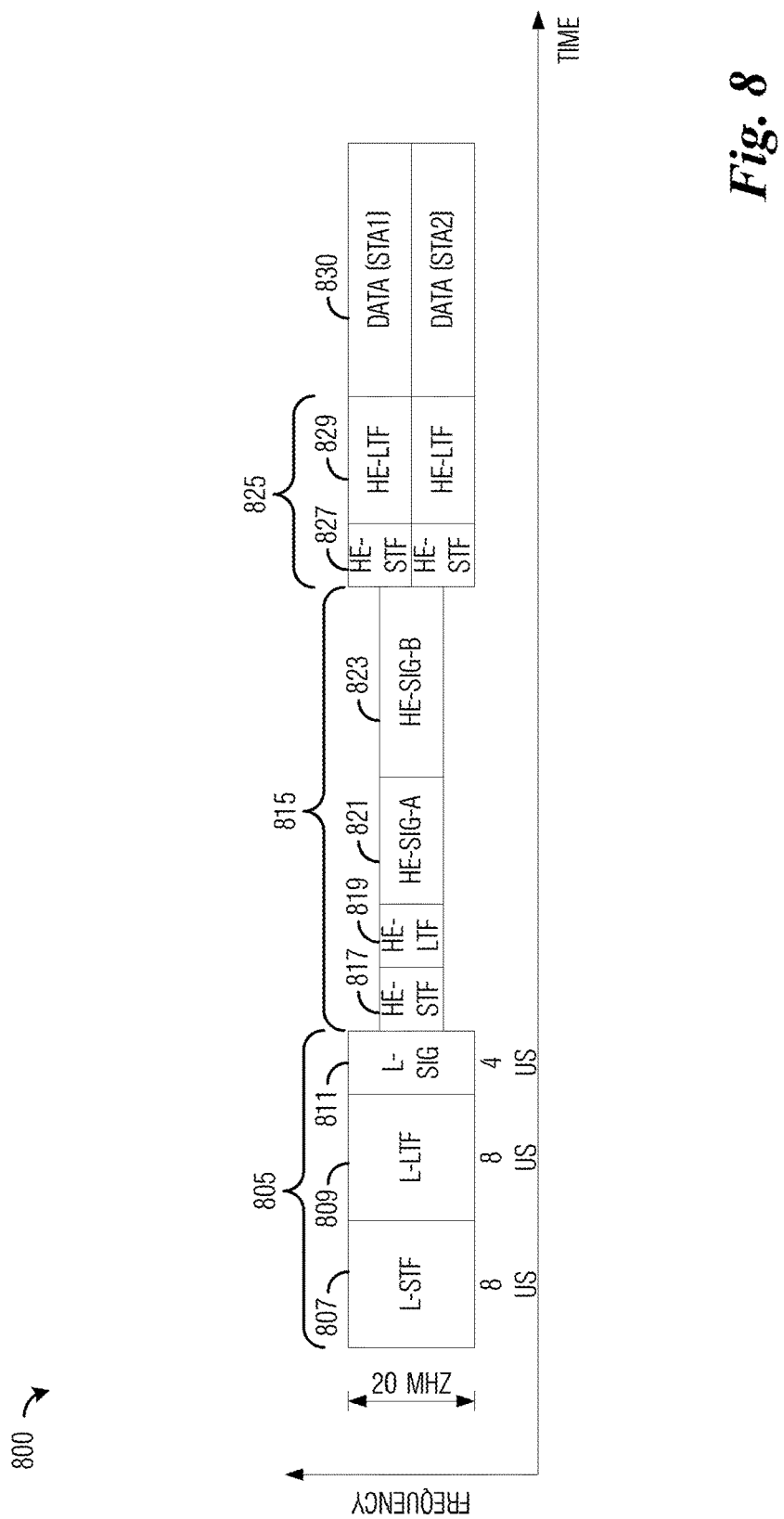
FIG. 8 illustrates a third example frame according to example embodiments described herein.

FIG. 8 illustrates a third example frame 800. Frame 800 includes a first preamble 805 (i.e., the legacy preamble with a L-STF 807, a L-LTF 809, and a L-SIG 811). Frame Boo also includes a second preamble 815 sent in a narrow bandwidth. Second preamble 815 includes (but not limited to): training signals such as a HE-STF 817 and a HE-LTF 819; and control information such as a HE-SIG-A 821 and optionally a HE-SIG-B 823. Frame Boo also includes 1 or more instances of an additional preamble 825 followed by corresponding data payloads 830. Additional preamble 825 includes HE-STF 827 and HE-LTF 829, for example.

Frame 800 does not include a R-L-SIG, so the coverage bottleneck is no longer the R-L-SIG. A receiver of frame 800 may need to perform detection for training signals, such as HE-STF 817 and/or HE-LTF 819 to determine if those signals are sent in the narrow band.

Figure 9:
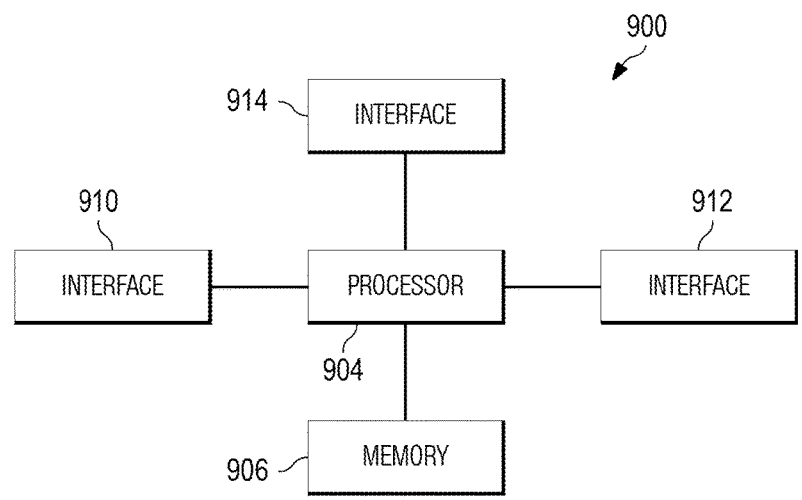
FIG. 9 illustrates a block diagram of an embodiment processing system 900 for performing methods described herein.

FIG. 9 illustrates a block diagram of an embodiment processing system 900 for performing methods described herein, which may be installed in a host device. As shown, the processing system 900 includes a processor 904, a memory 906, and interfaces 910-914, which may (or may not) be arranged as shown in FIG. 9. The processor 904 may be any component or collection of components adapted to perform computations and/or other processing related tasks, and the memory 906 may be any component or collection of components adapted to store programming and/or instructions for execution by the processor 904. In an embodiment, the memory 906 includes a non-transitory computer readable medium. The interfaces 910, 912, 914 may be any component or collection of components that allow the processing system 900 to communicate with other devices/components and/or a user. For example, one or more of the interfaces 910, 912, 914 may be adapted to communicate data, control, or management messages from the processor 904 to applications installed on the host device and/or a remote device. As another example, one or more of the interfaces 910, 912, 914 may be adapted to allow a user or user device (e.g., personal computer (PC), etc.) to interact/communicate with the processing system 900. The processing system 900 may include additional components not depicted in FIG. 9, such as long term storage (e.g., nonvolatile memory, etc.).

In some embodiments, the processing system 900 is included in a network device that is accessing, or part otherwise of, a telecommunications network. In one example, the processing system 900 is in a network-side device in a wireless or wireline telecommunications network, such as a base station, a relay station, a scheduler, a controller, a gateway, a router, an applications server, or any other device in the telecommunications network. In other embodiments, the processing system 900 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 10:
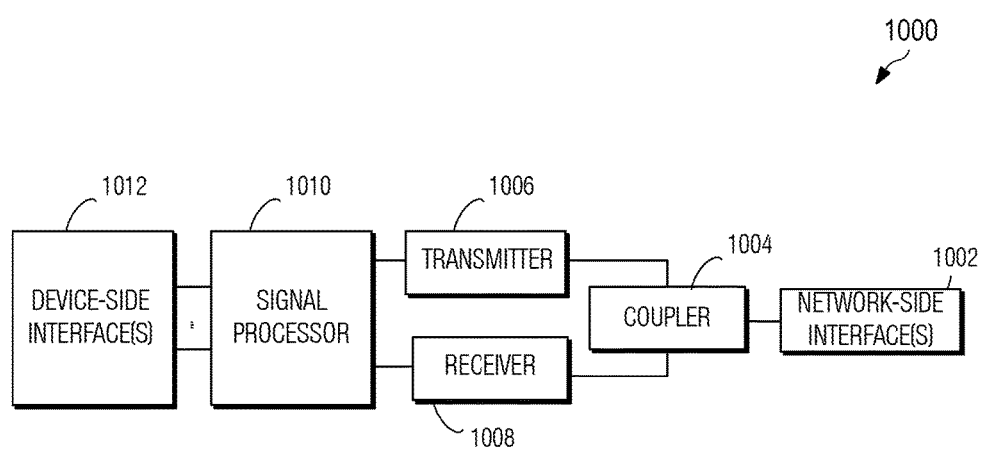
FIG. 10 illustrates a block diagram of a transceiver adapted to transmit and receive signaling over a telecommunications network according to example embodiments described herein.

In some embodiments, one or more of the interfaces 910, 912, 914 connects the processing system 900 to a transceiver adapted to transmit and receive signaling over the telecommunications network. FIG. 10 illustrates a block diagram of a transceiver 1000 adapted to transmit and receive signaling over a telecommunications network. The transceiver 1000 may be installed in a host device. As shown, the transceiver 700 comprises a network-side interface 1002, a coupler 1004, a transmitter 1006, a receiver 1008, a signal processor 1010, and a device-side interface 1012. The network-side interface 1002 may include any component or collection of components adapted to transmit or receive signaling over a wireless or wireline telecommunications network. The coupler 1004 may include any component or collection of components adapted to facilitate bi-directional communication over the network-side interface 1002. The transmitter 1006 may include any component or collection of components (e.g., up-converter, power amplifier, etc.) adapted to convert a baseband signal into a modulated carrier signal suitable for transmission over the network-side interface 1002. The receiver 1008 may include any component or collection of components (e.g., down-converter, low noise amplifier, etc.) adapted to convert a carrier signal received over the network-side interface 702 into a baseband signal. The signal processor 1010 may include any component or collection of components adapted to convert a baseband signal into a data signal suitable for communication over the device-side interface(s) 1012, or vice-versa. The device-side interface(s) 1012 may include any component or collection of components adapted to communicate data-signals between the signal processor 1010 and components within the host device (e.g., the processing system 900, local area network (LAN) ports, etc.).

The transceiver 1000 may transmit and receive signaling over any type of communications medium. In some embodiments, the transceiver 1000 transmits and receives signaling over a wireless medium. For example, the transceiver 1000 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 1002 comprises one or more antenna/radiating elements. For example, the network-side interface 1002 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1000 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a generating unit/module. The respective units/modules may be hardware, software, or a combination thereof. For instance, one or more of the units/modules may be an integrated circuit, such as field programmable gate arrays (FPGAs) or application-specific integrated circuits (ASICs).

Although the present disclosure and its advantages have been described in detail, it should be understood that various changes, substitutions and alterations can be made herein without departing from the spirit and scope of the disclosure as defined by the appended claims.

What is claimed is:

1. A method for operating a transmitting device, the method comprising:
   generating, by the transmitting device, a frame having at least a first preamble, a third preamble, and a second preamble; and
   transmitting, by the transmitting device, the first preamble in a first frequency resource, the third preamble in a third frequency resource, and the second preamble in a second frequency resource, the second frequency resource having a smaller bandwidth than the first frequency resource, and a beginning time of the second frequency resource being after an ending time of the third frequency resource.

2. The method of claim 1, wherein a beginning time of the third frequency resource is after an ending time of the first frequency resource.

3. The method of claim 1, wherein the third preamble comprises an indication that the second frequency resource has the smaller bandwidth than the first frequency resource.

4. The method of claim 3, wherein the indication is a presence of a predetermined sequence modulated in the third frequency resource.

5. The method of claim 1, wherein the first preamble comprises a plurality of first orthogonal frequency division multiplexed (OFDM) symbols, each first OFDM symbol having a first symbol duration, and the third preamble comprises a plurality of third OFDM symbols, each having a third symbol duration, and wherein the third symbol duration is equal to the first symbol duration.

6. The method of claim 1, wherein the first preamble comprises a legacy short training field (L-STF), a legacy long training field (L-LTF), and a legacy signal field (L-SIG), wherein the third preamble comprises a repeated L-SIG (R-L-SIG), and wherein the R-L-SIG comprises a subset of the L-SIG.

7. The method of claim 1, wherein the frame further comprises a data payload, and wherein the method further comprises transmitting the data payload in a fourth frequency resource.

8. The method of claim 7, wherein the first preamble comprises a plurality of first OFDM symbols, each first OFDM symbol having a first symbol duration, wherein the third preamble comprising a plurality of second OFDM symbols, each third OFDM symbol having a third symbol duration, wherein the second preamble comprises a plurality of second OFDM symbols, each second OFDM symbol having a second symbol duration, wherein the data payload comprises a plurality of fourth OFDM symbols, each fourth OFDM symbol having a fourth symbol duration, and wherein the second symbol duration is equal to the fourth symbol duration.

9. A method for operating a receiving device, the method comprising:
   receiving, by the receiving device, a first preamble of a frame in a first frequency resource;
   receiving, by the receiving device, a third preamble of the frame in a third frequency resource; and
   receiving, by the receiving device, a second preamble of the frame in a second frequency resource, the second frequency resource having a smaller bandwidth than the first frequency resource, and a beginning time of the second frequency resource being after an ending time of the third frequency resource.

10. The method of claim 9, wherein a beginning time of the third frequency resource is after an ending time of the first frequency resource.

11. The method of claim 9, wherein the third preamble comprises an indication that the second frequency resource has the smaller bandwidth than the first frequency resource.

12. A transmitting device comprising:
   a non-transitory memory storage comprising instructions; and
   a processor in communication with the memory storage, wherein the processor executes the instructions to:
      generate a frame having at least a first preamble, a third preamble, and a second preamble, and
      transmit the first preamble in a first frequency resource, the third preamble in a third frequency resource, and the second preamble in a second frequency resource, wherein the second frequency resource has a smaller bandwidth than the first frequency resource, and wherein a beginning time of the second frequency resource is after an ending time of the third frequency resource.

13. The transmitting device of claim 12, wherein the third preamble comprises an indication that the second frequency resource has the smaller bandwidth than the first frequency resource.

14. The transmitting device of claim 13, wherein the indication is a presence of a predetermined sequence modulated in the third frequency resource.

15. The transmitting device of claim 12, wherein the first preamble comprises a plurality of first orthogonal frequency division multiplexed (OFDM) symbols, each first OFDM symbol having a first symbol duration, and the third preamble comprises a plurality of third OFDM symbols, each having a third symbol duration, and wherein the third symbol duration is equal to the first symbol duration.

16. The transmitting device of claim 12, wherein the processor executes the instructions to transmit a data payload in a fourth frequency resource, wherein the first preamble comprises a plurality of first OFDM symbols, each first OFDM symbol having a first symbol duration, wherein the third preamble comprises a plurality of third OFDM symbols, each third OFDM symbol having a third symbol duration, wherein the second preamble comprises a plurality of second OFDM symbols, each second OFDM symbol having a second symbol duration, wherein the data payload comprises a plurality of fourth OFDM symbols, each fourth OFDM symbol having a fourth symbol duration, and wherein the second symbol duration is equal to the fourth symbol duration.

17. The transmitting device of claim 12, wherein a beginning time of the third frequency resource is after an ending time of the first frequency resource.

18. A receiving device comprising:
   a non-transitory memory storage comprising instructions; and
   a processor in communication with the memory storage, wherein the processor executes the instructions to:

receive a first preamble of a frame in a first frequency resource, receive a third preamble of the frame in a third frequency resource, and receive a second preamble of the frame in a second frequency resource, wherein the second frequency resource has a smaller bandwidth than the first frequency resource, and wherein a beginning time of the second frequency resource is after an ending time of the third frequency resource.

19. The receiving device of claim 18, wherein a beginning time of the third frequency resource is after an ending time of the first frequency resource.

20. The receiving device of claim 18, wherein the third preamble comprises an indication that the second frequency resource has the smaller bandwidth than the first frequency resource.

* * * * *